May 28, 1935.  L. A. DUMSER ET AL  2,002,938

MACHINE TOOL

Filed March 6, 1933　　　3 Sheets-Sheet 1

Inventors:
Leo A. Dumser &
Oscar W. Floody
By Axel A. Hofgren
their Atty.

May 28, 1935.  L. A. DUMSER ET AL  2,002,938
MACHINE TOOL
Filed March 6, 1933   3 Sheets-Sheet 2

Inventors:
Leo A. Dumser &
Oscar W. Floody

May 28, 1935.　　　　L. A. DUMSER ET AL　　　　2,002,938
MACHINE TOOL
Filed March 6, 1933　　　　3 Sheets-Sheet 3

Inventors:
Leo A. Dumser &
Oscar W. Floody
By Axel A. Hofgren
their Atty.

Patented May 28, 1935

2,002,938

UNITED STATES PATENT OFFICE 2,002,938

MACHINE TOOL

Leo A. Dumser and Oscar W. Floody, Rockford, Ill., assignors to Sundstrand Machine Tool Co., Rockford, Ill., a corporation of Illinois Application March 6, 1933, Serial No. 659,744

16 Claims. (Cl. 29—70)

This invention relates generally to machine tools and more particularly to a machine for splitting piston ring castings.

It is an object of the invention to provide a new and improved machine of simple construction adapted to produce piston rings from multiple castings at a high rate of speed.

Another object is to provide a novel and simplified mechanism for reciprocating the work support of a machine tool.

Another object is to provide a new and improved work supporting fixture embodying a rotating chucking device, together with means for rotating said device and for operating the work clamping jaws of said device during rotation.

Another object is to provide such a machine embodying a rotating cutter arbor together with a reciprocatory support having work supporting fixtures mounted on opposite sides of the arbor, work chucking devices rotatably mounted on said fixtures on axes parallel to said cutter arbor and extending forwardly therefrom to facilitate loading and unloading, means for driving said work chucking devices at a relatively low rate of speed, means for operating the clamping jaws of said devices during rotation, and means for reciprocating said support, at a traverse rate during non-cutting movements thereof and at a feed rate at each end of the stroke during the cutting operation.

Further objects will become apparent from the following detailed description taken in connection with the accompanying drawings, in which.

Figure 1:
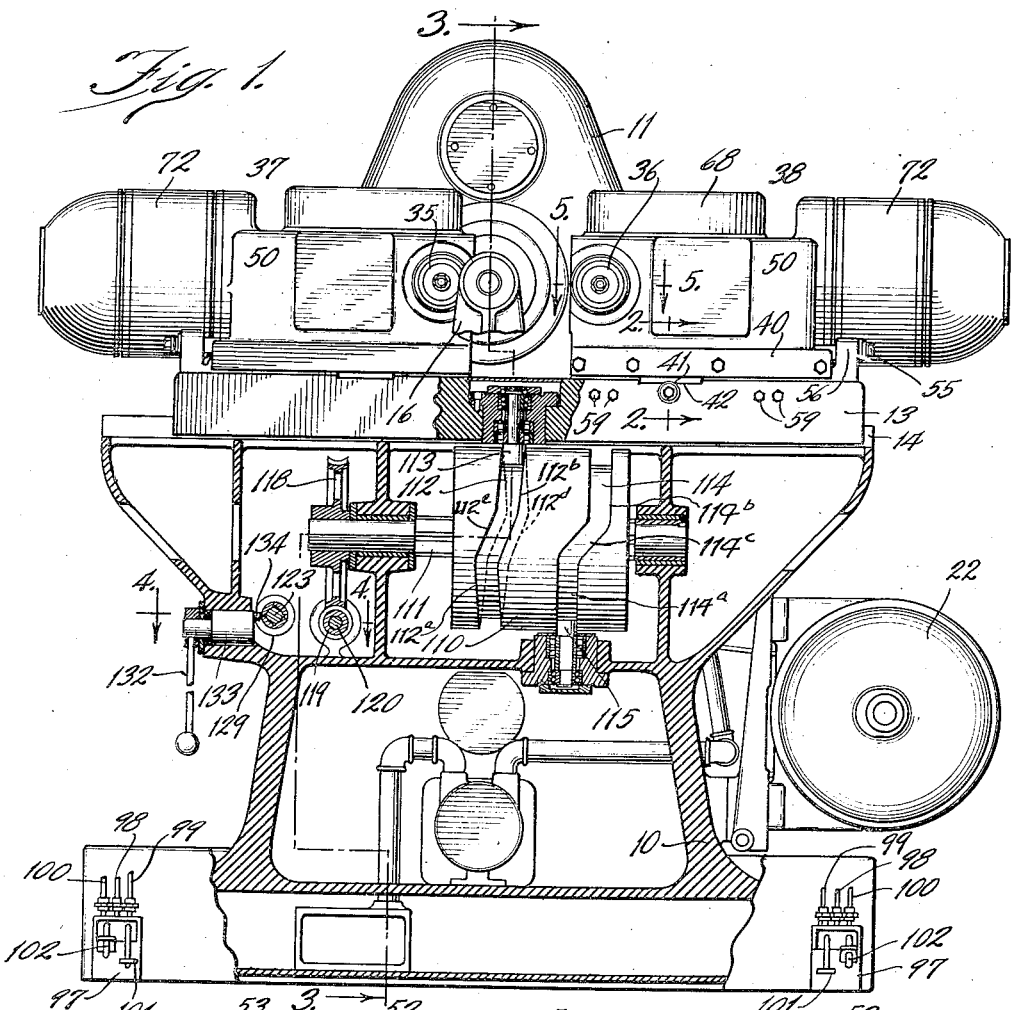
Fig. 1 is a front elevation of a preferred form of the invention, partly in section along the line 1—1 of Fig. 3.

Although we have illustrated in the drawings and shall herein describe in detail a preferred form of the invention, it is to be understood that we do not thereby intend to limit the invention to the specific form and arrangement illustrated, but intend to cover all modifications and alternative constructions falling within the spirit and scope of the appended claims.

Figure 3:
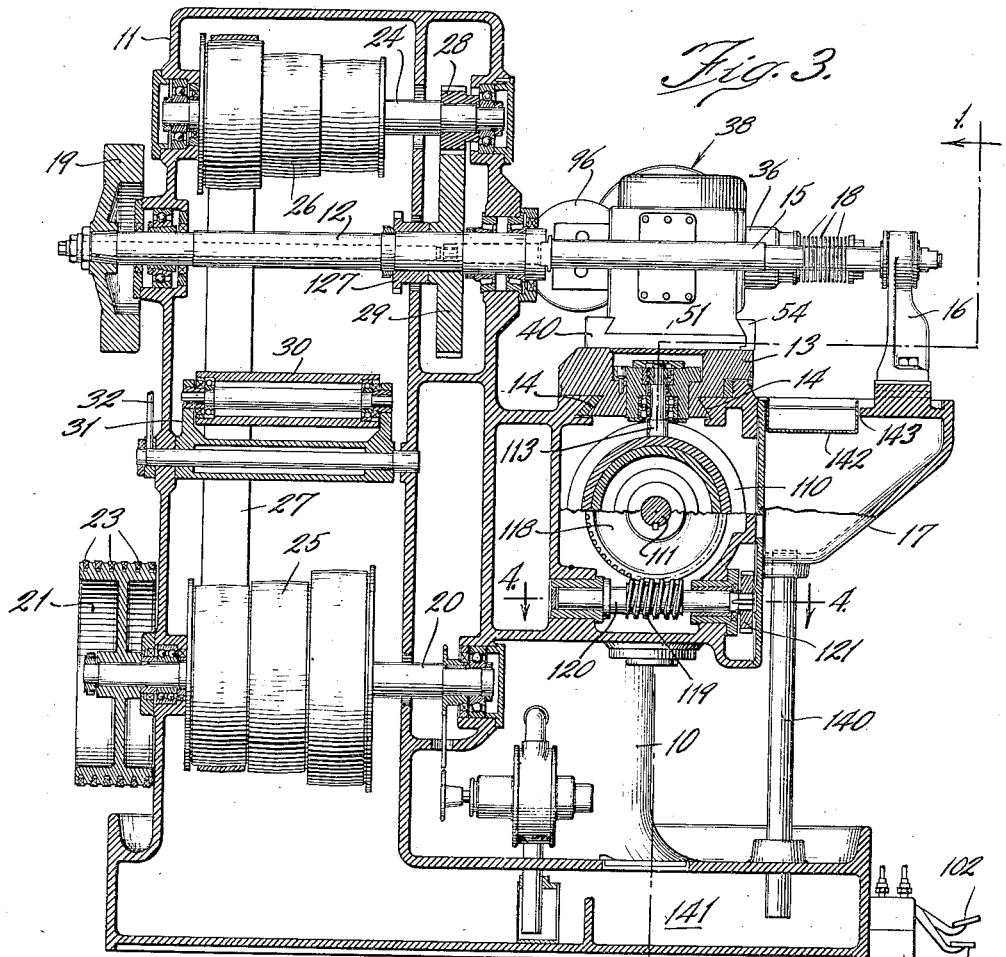
Fig. 3 is a vertical section approximately along the line 3—3 of Fig. 1.

As illustrated in the drawings, the exemplary form of the invention is embodied in a machine having a frame comprising a bed or base 10 and a column 11 formed integrally therewith and extending upwardly from the rear portion thereof. A tool or cutter supporting spindle 12 is rotatably mounted in the column 11, and a work support 13 is slidable on ways 14 which extend transversely of the spindle 12 and on the upper portion of the base 10 in front of the column. A cutter arbor 15 is suitably connected at one end to the forward end of the spindle 12 so as to be centered and driven thereby and is preferably supported at its outer end by means of a bearing support 16 mounted on a forward projecting portion 17 of the base 10. As illustrated in Fig. 3 the arbor 15 carries a plurality of laterally spaced cutters 18. Preferably a fly wheel 19 is mounted directly on the spindle 12 so as to prevent chatter of the cutters against the work.

The spindle 12 may be arranged to be driven in any preferred manner. In the present form of the invention a shaft 20 is rotatably mounted in the lower rear portion of the frame and carries a pulley 21 arranged to be driven from a motor 22 by means of a plurality of belts 23. A shaft 24 is rotatably mounted in the upper portion of the frame parallel to the shaft 20, the shafts being provided with cone pulleys 25 and 26 and connected by means of a belt 27. The spindle 12 is herein shown connected to the shaft 24 by means of intermeshing gears 28 and 29 secured to rotate with the shaft 24 and spindle 12 respectively. Preferably an elongated idler pulley 30 is rotatably mounted on a swinging yoke 31 supported in the frame and is operable by means of a handle 32 from the rear of the machine.

In its preferred form the invention is particularly adapted for use in splitting piston ring castings, and for this reason is shown equipped with a pair of work chucking devices 35 and 36 which are rotatably mounted in positions parallel to the cutter arbor 15 on work supporting fixtures 37 and 38 carried on the opposite ends of the work support 13. These chucking devices may be of the form illustrated in Fig. 5, and described more fully hereinafter, and are generally adapted to carry one or more work blanks in the form of cast rings, each one of which, during the operation of the machine, is split into two or more piston rings. The fixtures 37 and 38 are generally duplicates with the exception that one is right-handed and the other lefthanded, so that a detailed description of one will suffice.

Figure 2:
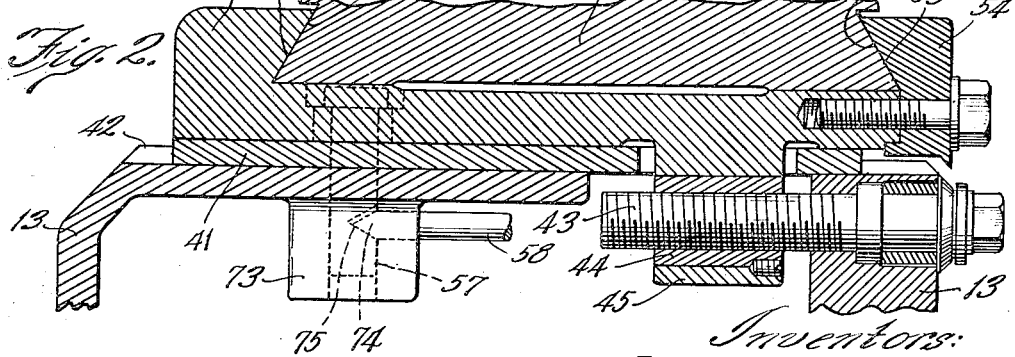
Fig. 2 is a fragmentary section approximately along the line 2—2 of Fig. 1.

As illustrated herein, and most clearly in Figs. 1, 2 and 3, a member 40 is slidably mounted on the support 13 and is guided for movement transversely thereof by means of a projecting portion 41 on said member engaging in a guide groove 42 in the support 13. This member is arranged to be adjusted transversely of the work support 13 by means of a screw device 43 rotatably mounted in the forward portion of the support 13 and having threaded engagement with a nut 44 carried in a depending portion 45 of the member 40. A casing 50, forming a frame for the fixture, has a lower portion 51 provided with bevelled side edges 52 engaging ways 53 extending in the member 40 longitudinally of the support 13 so as to permit of adjustment of the casing 50 longitudinally of the work support 13. Preferably one of the ways 53 is formed on a clamping gib 54 which forms a part of the member 40, so that the casing may be secured in its adjusted position. If desired, adjusting screws 55 may be provided in upwardly extending lugs 56 on the end of the member 40 for the purpose of moving the casing longitudinally of said member. Clamping devices or bolts 57 (Fig. 2), are adapted to secure the member 40 to the support 13. These bolts are operable by means of rods 58, screw threaded in the forward portion of the support and having tool receiving heads 59 (Fig. 1). The rear ends of the rods extend through recesses in depending lugs 73 on the support and have pointed ends 74 engaging conical seats 75 in the bolts 57 with a cam action to draw the bolts downwardly.

Figure 5:
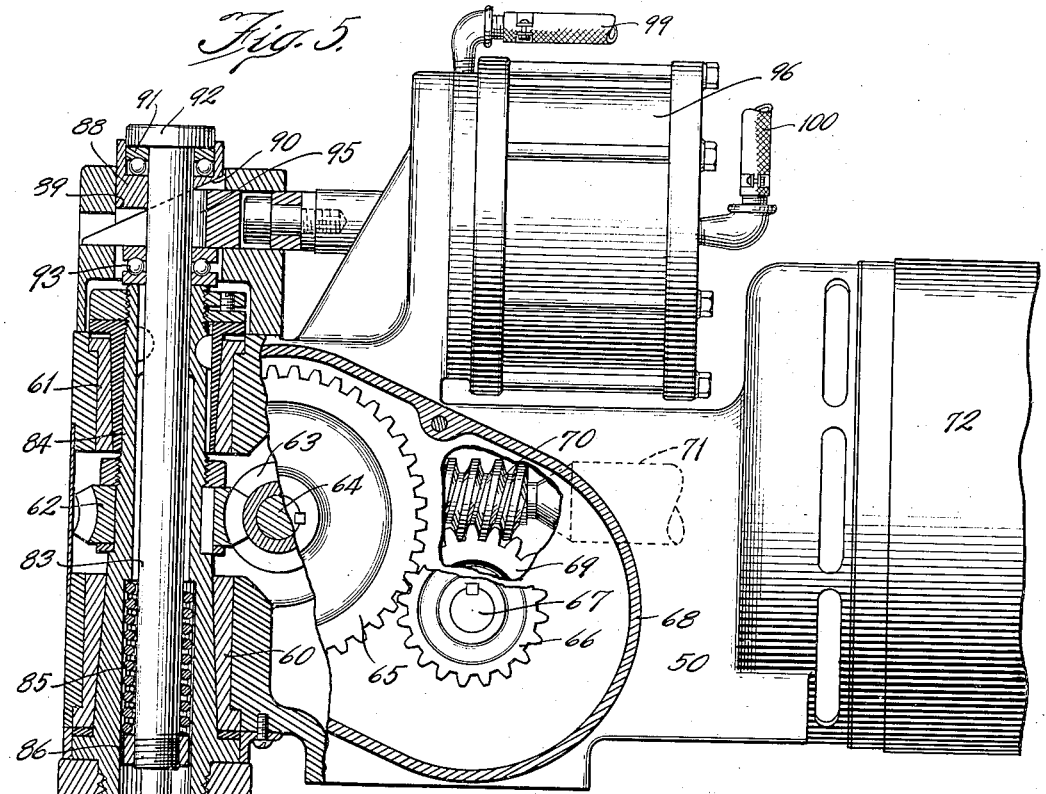
Fig. 5 is an enlarged fragmentary plan view of a work supporting fixture, partly in section along the line 5—5 of Fig. 1.

As illustrated in Fig. 5, the chucking device 36 is rotatably mounted in the casing 50 by means of bearings 60 and 61 and carries a worm wheel 62 intermediate the bearings, which meshes with a worm 63 secured to a vertical shaft 64. The upper end of the shaft 64 projects above the casing 50 to receive a pick-off gear 65, this gear meshing with a corresponding pick-off gear 66 carried on the upper end of an adjacent parallel shaft 67. Preferably a detachable cover plate 68 is provided to enclose these pick-off gears. The shaft 67 extends down into the casing 50 and carries a worm wheel 69 meshing with a worm 70 which is secured to the shaft 71 of an electric motor, 72, this motor being secured to and movable with the casing 50. The gearing intermediate the motor and chucking device is designed to rotate the chucking device at a relatively low rate of speed. During the cutting operation in a machine of the type illustrated in the drawings the work is rotated through twenty-five or thirty revolutions. Preferably the work chucking devices rotate continuously during the operation of the machine, finished work pieces being removed and work blanks being substituted while the chucking devices rotate.

Figure 6:
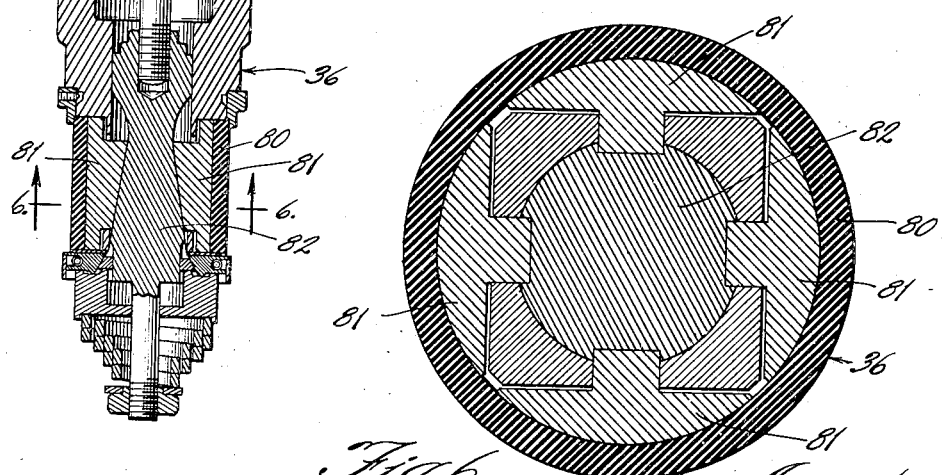
Fig. 6 is an enlarged section along the line 6—6 of Fig. 5.

In order to enable an operator to remove finished work pieces without stopping the motor 72, means is provided for operating the jaws of the chucking devices without stopping the rotation thereof. As illustrated most clearly in Figs. 5 and 6, the chucking device 36 is provided with a tubular member 80, of resilient material, which is arranged to receive multiple piston ring castings and is arranged to be expanded into contact with the castings by means of a plurality of wedge shaped jaws 81. A tapered cylindrical actuating member 82 engages the inner surfaces of said jaws and is connected to a rod 83 extending longitudinally through a bore in the spindle 84 of the chucking device. The rod 83 is normally urged forwardly by means of a coiled spring 85 positioned between a collar 86 on the rod 83 and a shoulder in the spindle 84. The rod 83 rotates with the spindle and at its rear end extends through a sleeve 88 which is provided with a transversely extending slot 89 positioned beneath the rod 83 and having a beveled side wall 90. A ball thrust bearing 91 is positioned intermediate the sleeve 88 and a flange 92 on the rear end of the rod 83, and a ball thrust bearing 93 is positioned intermediate the sleeve 88 and the rear end of the spindle 84. A wedge shaped actuating member 95 is slidably mounted in a slot in the casing 50 and extends into the slot 89, and is operable when moved toward the left (Fig. 5) to move the rod 83 against the action of the spring 85 and thereby expand the jaws 81 and tubular member 80. When the actuating member 95 is moved toward the right (Fig. 5) the chuck jaws are released by the action of the spring 85. As illustrated herein the actuating member 95 is arranged to be operated by means of a piston mounted in a cylinder 96 carried on the casing 50. The control for this piston and cylinder device preferably includes a foot operated valve device 97 positioned on the forward portion of the base and adjacent the right-hand end thereof (Fig. 1). This valve device has a supply conduit 98 which may be connected to a suitable supply of compressed air or other fluid, and has conduit connections 99 and 100 extending to the opposite ends of the cylinder 96. The valve device, which may be of any preferred construction, has a pair of pedals 101 and 102 and is so arranged that when the pedal 101 is depressed air from the supply conduit 98 is fed to the connecting conduit 99 and the connecting conduit 100 is exhausted. When the pedal 102 is depressed the pedal 101 is raised and air is fed from the supply conduit 98 to the connecting conduit 100, the connecting conduit 99 being exhausted.

In the preferred form illustrated in the drawings, the work supporting fixture 38 together with its chucking device 36 and operating and control mechanism is duplicated in the fixture 37 on the other end of the work support 13, the chucking device 35 and the operating and control mechanism therefor including a second valve device 97 positioned at the lower forward edge of the base at the left-hand end thereof (Fig. 1). In operation the work support 13 is arranged to be reciprocated so that while the cutters on the arbor 15 are operating on work pieces, for example, on the chucking device 35 as illustrated in Fig. 1, finished work pieces may be removed from the chucking device 36 and that chucking device reloaded. The cyclic movements of the work support 13 preferably comprise a rapid or traverse movement when no cutting is taking place, and a slow or feed movement during the cutting operations. This results in a rapid movement in one direction to bring the work up to the cutters, followed by slow feed movement during the cutting operation, after which the work support is moved in the reverse direction at a rapid rate until the work on the other fixture is adjacent the cutters, followed by a slow feed movement. This cycle is repeated continuously, the time required for the cutting operation generally being sufficient to permit an operator to remove finished work pieces from the other chucking device and for reloading that device.

In order to obtain this cyclic movement of the work support 13, we have provided a simple and efficient actuating mechanism including a cam drum 110 (Figs. 1 and 3) which is mounted on and splined to a shaft 111 rotatably mounted in the base portion of the frame beneath the work support. The cam drum is provided with a cam slot 112 in which a roller 113, carried on the work support 13, engages. Thus during rotation of the cam drum the work support is given a reciprocatory movement as determined by the shape of the slot 112. In order to increase the speed of movement of the work support during certain portions of the cycle, and to amplify the stroke thereof beyond that obtained from the displacement of the slot 112, the invention provides means for moving the cam drum longitudinally during said portions of its rotary movement. As illustrated herein the cam drum is slidably mounted on the shaft 111 to which it is splined and has a second cam slot 114 in which a roller 115, mounted in the base 10, engages. Since the position of the roller 115 is fixed in the base it will be apparent that upon rotation of the cam drum the drum will be forced longitudinally on the shaft 111. The cam slots 112 and 114 are so proportioned as to obtain a rapid movement of the work support 13 during the non-cutting movements thereof and a slow feed movement during the cutting operations.

In the preferred form of the invention the cam slot 114 is provided with straight portions 114a and 114b of substantially equal length connected by diametrically opposite inclined portions 114c. While the roller 115 is in either of the straight portions of the cam slot the cam drum will of course be held against longitudinal movement.

The cam slot 112 is provided with slightly inclined or feeding portions 112a and 112b of substantially equal length which are connected by means of inclined transverse portions 112c and 112d. With the parts as illustrated in Fig. 1, and the cam drum 110 rotating in a clockwise direction (Fig. 3) the support 13 is being fed at a feed rate toward the right by engagement of the roller 113 in the cam slot portion 112b. When the roller reaches the end of the cam slot portion 112b and enters the portion 112d the table is reversed and actuated at a higher rate of speed toward the left (Fig. 1). Simultaneously with the entrance of the roller 113 in the cam slot portion 112d the roller 115 enters a cam slot portion 114c whereupon the cam drum is also moved rapidly toward the left thus augmenting the movement of the work support. When the roller 113 has reached the beginning of the cam slot portion 112a and the roller 115 is about to enter the cam slot portion 114b, the work support 13 has been moved to a position wherein the cutters 18 are about to engage the work blanks carried on the chucking device 36. The slow feed movement of the work support toward the left is then commenced with the roller 115 riding in the straight portion 114b of the cam slot 114 and the roller 113 engaging in the feed portion 112a of the cam slot 112. The reversing and return movements are repeated at the end of each feeding movement.

Figure 4:
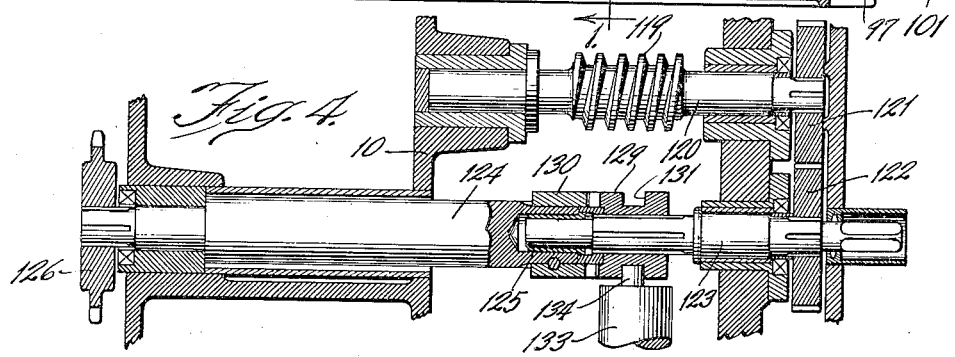
Fig. 4 is an enlarged fragmentary section along the line 4—4 of Figs. 1 and 3.

The cam shaft 111 may be driven in any preferred manner. As illustrated herein this shaft carries a worm wheel 118 which meshes with a worm 119 carried on a shaft 120. The front end of the shaft 120 is splined for the reception of a pick-off gear 121 which meshes with a corresponding pick-off gear 122 similarly splined on the forward end of an adjacent parallel shaft 123 (Fig. 4). The rear end of the shaft 123 is reduced in size and is rotatably mounted in the forward end of a coaxial shaft 124 by means of a sleeve bearing 125. The shaft 124 carries a sprocket 126 which is driven from a sprocket 127 (Fig. 3) on the spindle 12, by means of a suitable chain (not shown). In order to connect the shaft 123 to the coaxial shaft 124 a toothed clutch member 129 is splined on the shaft 123 and has teeth engageable with a complementary clutch member 130 pinned to the adjacent end of the shaft 124. The clutch member 129 has a peripheral groove 131 and is operable by means of a handle 132 (Fig. 1) mounted on a short shaft 133 which carries an eccentric pin 134 engaging in the slot 131.

In using the machine an operator may start the main motor 22 after having loaded both chucking devices with work blanks. The work fixture motors 72 are also started, and the feeding mechanism for the work support 13 is placed in operation by engaging the clutch members 129 and 130. The work support will then move in one direction (for example, toward the right in Fig. 1), at a rapid rate until the work pieces on the fixture 37 are about to engage the cutters 18, whereupon the speed of the support is reduced to a feed rate, and continues at that rate during the cutting operation. When the cutting operation is completed the work support 13 is returned at a rapid rate in order to engage the cutters with the work blanks on the other chucking device 36. As soon as the work on chucking device 35 has receded from the cutters sufficiently the operator, by depressing the inner treadle 101 of the left-hand valve 97 (Fig. 1) releases the finished work pieces from said chucking device, and practically simultaneously with the operation of the valve by his foot, the operator's hands are available for removing the finished work pieces and reloading the chucking device with work blanks. The treadle 102 of the same valve is then operated to clamp the new work pieces to the chucking device. This operation is repeated after each feeding movement of the work support, the provision of foot operated means for controlling the releasing and clamping of the work pieces leaving the operator's hands free for removing finished work pieces and replacing them with work blanks. During this operation the chucking devices continue to rotate at a relatively low speed.

As will be apparent, and particularly from Fig. 3, the cutters 18 are positioned on the arbor 15 in front of the work support 13 and above the forwardly extending portion 17 of the base, which is hollow. Preferably a drain pipe 140 is provided connecting the lower end of this portion of the base with a coolant reservoir 141 formed in the lower portion of the base and a removable pan 142 is positioned in an opening 143 immediately beneath the cutters to prevent foreign matter from passing with the cutter coolant back into the base.

We claim as our invention:

1. A machine comprising, in combination, a frame, an arbor rotatably mounted on said frame, a work support movable transversely on said frame beneath said arbor, means for reciprocating said work support at feed and traverse rates including means for moving the support at a feed rate prior to its reversal at each end of its stroke, a pair of work chucking and rotating fixtures on said support one on each side of said arbor, each comprising a holder and a work chucking device rotatably mounted on the holder on an axis parallel with said cutter arbor and in overhung relation thereto so as to facilitate replacing finished work pieces with work blanks, means for driving said chucking device at a relatively low speed, and means for clamping work pieces to said chucking devices and for releasing said work pieces therefrom during continued rotation of the chucking devices comprising piston and cylinder devices on said fixtures, and control valves for said piston and cylinder devices having operating pedals positioned on the front of said frame adjacent to the bottom thereof and arranged to be foot operated.

2. A machine comprising, in combination, a frame, an arbor rotatably mounted on said frame, a work support movable transversely on said frame, means for reciprocating said work support at feed and traverse rates including means for moving the support at a feed rate prior to its reversal at each end of its stroke, a pair of work chucking and rotating fixtures on said support one on each side of said arbor, each comprising a work chucking device rotatably mounted on an axis parallel with said cutter arbor and extending forwardly from the work support in overlying relation to the front portion of the frame to facilitate loading and unloading, means for driving said chucking device at a relatively low speed, and means for clamping work pieces to said chucking devices and for releasing said work pieces therefrom during continued rotation of the chucking devices comprising motor devices on said fixtures, and control devices for said motor devices positioned in laterally spaced relation on the front of said frame adjacent the bottom thereof and having pedals arranged to be foot operated.

3. A machine tool comprising, in combination, a base, a column uprising from the rear portion of said base, a table slidably mounted on the forward portion of said base for movement transversely in front of said column, a spindle rotatably mounted in said column on a horizontal axis extending transversely of said table, a work supporting fixture mounted on each end of said table and on opposite sides of a saw arbor supported by said spindle, each fixture comprising a housing, a work chucking device rotatably mounted on an axis parallel to said spindle and extending forwardly from the housing, a motor supported from said housing and movable therewith, gearing intermediate said motor and work chucking device including pick-off gears readily accessible from the outside of said housing, and means for actuating the work clamping means of said chucking device including a piston and cylinder device carried on said housing, means for reciprocating said table, and means for controlling the movements of said table.

4. A machine comprising, in combination, a frame, a work support movably mounted on said frame, and means for reciprocating said support at feed and traverse rates comprising a driven shaft rotatably mounted on said frame beneath said work support, a cam drum splined to and slidable on said shaft, a follower on said work support engaging in a slot in said drum so as to reciprocate the support during rotation of the drum, and means for reciprocating the cam drum longitudinally on said shaft to augment the movement of the support during certain portions of its stroke comprising a follower mounted on said frame engaging a second slot in said drum.

5. A machine comprising, in combination, a frame, a work support movably mounted on said frame, and means for reciprocating said support at feed and traverse rates comprising a driven shaft rotatably mounted in said frame, a cam on said shaft, a follower on said work support engaging said cam so as to reciprocate the support during rotation of the cam, and means for reciprocating the cam bodily during its rotation to augment the movement of the support during certain portions of its stroke.

6. A machine comprising, in combination, a frame, a support movably mounted on said frame, and means for reciprocating said support at feed and traverse rates comprising a driven shaft rotatably mounted on said frame, a cam drum splined to and slidable on said shaft, a follower on said support engaging in a cam slot in said drum so as to reciprocate the support during rotation of the drum, and means for reciprocating the cam drum longitudinally of said shaft to modify the movement of the support during certain portions of its stroke comprising a follower fixed on said frame engaging a second cam slot in said drum.

7. A machine comprising, in combination, a frame, a support movably mounted on said frame, and means for reciprocating said support at feed and traverse rates comprising a driven shaft rotatably mounted on said frame, a cam drum on said shaft, a follower on said support engaging in a cam slot in said drum so as to reciprocate the support during rotation of the drum, and means for reciprocating the cam drum longitudinally of said support to modify the movement of the support during certain portions of its stroke comprising a follower mounted on said frame engaging a second cam slot in said drum.

8. A machine tool comprising, in combination, a base, a column uprising from the rear portion of said base, a table slidably mounted on said base for movement transversely in front of said column, a spindle rotatably mounted in said column on a horizontal axis extending transversely of said table, a cutter arbor mounted on said spindle and extending forwardly over the table, said base having a hollow portion projecting in front of the table, means on said hollow portion for supporting the forward end of said arbor, a work supporting fixture mounted on each end of said table and on opposite sides of said arbor, each fixture having a rotatably mounted work chucking device extending forwardly therefrom over the hollow portion of said base, means for rotating said work chucking devices, and means for reciprocating said table.

9. A machine tool comprising, in combination, a base, a column uprising from the rear portion of said base, a table slidably mounted on the forward portion of said base for movement transversely in front of said column, a tool support rotatably mounted in said column on a horizontal axis and extending forwardly over the table, said base having a hollow portion projecting in front of the table to receive the tool coolant and to support the forward end of the tool support, a work supporting fixture mounted on one end of said table having a rotatably mounted work chucking device extending forwardly therefrom over the hollow portion of said base, means for rotating said work chucking device, and means for reciprocating said table.

10. A piston ring splitting machine comprising, in combination, a base, a column uprising from the rear portion of said base, a table slidably mounted on said base for movement transversely in front of said column, a tool support rotatably mounted in said column on a horizontal axis and extending forwardly over the table, a pair of work supporting fixtures mounted on said table on opposite sides of said tool support, each fixture having a rotatably mounted work chucking device extending forwardly therefrom in overhanging relation adjacent to the forward side of the base to facilitate loading multiple piston ring castings thereon, means for rotating said work chucking devices, and means for reciprocating said table.

11. A machine tool comprising, in combination, a base, a column uprising from the rear portion of said base, a table slidably mounted on said base for movement transversely in front of said column, said base having a hollow portion open at the top projecting forwardly in front of said table, a spindle rotatably mounted in said column on a horizontal axis extending transversely of said table, a cutter arbor mounted on said spindle and extending forwardly over the table and the hollow portion of the base, a work supporting fixture on said table on each side of said arbor, each fixture having a rotatably supported spindle carrying a work chucking device projecting over the hollow portion of said base, means for rotating said devices, and means for reciprocating the table.

12. A machine comprising, in combination, a frame, a support movably mounted on said frame, and means for reciprocating said support comprising a driven shaft mounted adjacent to said support, a cam drum splined to and movable longitudinally of said shaft, a follower on said work support engaging a slot in said drum so as to reciprocate the support during rotation of the drum, and a second cam and follower device one part of which is mounted on said frame and the other on said drum arranged to shift the drum longitudinally of the shaft whereby to augment the movement of the support in certain portions of its stroke.

13. A machine comprising in combination, a frame, an arbor rotatably mounted on said frame, a work support movable transversely on said frame beneath said arbor, means for reciprocating said work support at feed and traverse rates including means for moving the support at a feed rate prior to its reversal at each end of its stroke, a pair of work chucking and rotating fixtures on said support, one on each side of said arbor, each comprising a housing and a work chucking device rotatably mounted on said housing on an axis parallel with said cutter arbor and having a work carrying portion projecting forwardly from said housing in overhanging relation to the front edge of the machine so that work pieces may be readily chucked, means for driving said chucking device at a relatively low speed, and means for clamping work pieces to said chucking devices and for releasing said work pieces therefrom during continued rotation of the chucking devices including control devices positioned on the front of the machine adjacent the ends thereof where they are readily actuated while work pieces are being chucked.

14. A machine comprising in combination, a bed, a column rising from the rear portion of said bed, an arbor rotatably mounted in said column and projecting over the front portion of said bed, a work support mounted on the front portion of said bed, movable transversely beneath said arbor, means for reciprocating said work support at feed and traverse rates, a pair of work chucking and rotating fixtures on said support, one on each side of said arbor, each fixture comprising a housing and a work chucking device rotatably mounted on said housing on an axis parallel with said cutter arbor and having a work carrying portion projecting forwardly from said housing beyond said work support and in overlying relation to the forward edge of said bed within easy reach of an operator standing at the front of the machine, means for driving said chucking device at a relatively low speed, and means for clamping said work pieces to said chucking devices and for releasing said work pieces therefrom during continued rotation of the chucking devices including control devices positioned on the front of said bed adjacent the ends thereof.

15. A machine comprising in combination, a frame, an arbor rotatably mounted on said frame and projecting to the forward edge thereof, a work support movable transversely on said frame beneath said arbor, means for reciprocating said work support at feed and traverse rates, a pair of work chucking and rotating fixtures on said support, one on each side of said arbor, each fixture comprising a housing and a work chucking device rotatably mounted on said housing on an axis parallel with said arbor, means for driving said chucking device at a relatively low speed, and means for clamping work pieces to said chucking devices and for releasing said work pieces therefrom during continued rotation of the chucking devices including control devices positioned on the front of said frame adjacent the ends thereof, each of said chucking devices being journaled only intermediate its ends and having a work carrying portion projecting forwardly from said housing beyond said work support and in overlying relation to the front portion of said frame for convenient replacement of work by an operator standing at the front of the machine adjacent the control devices for the chucking devices.

16. A machine tool comprising in combination, a frame, an arbor rotatably mounted on said frame, a motor for rotating said arbor, a table slidably mounted on said frame transversely beneath said arbor, means for reciprocating said table at feed and traverse rates, a work supporting fixture mounted on each end of said table and on opposite sides of said arbor, each fixture comprising a housing, a work chucking device rotatably mounted on an axis parallel to said arbor, a first motor supported from said housing operatively connected to rotate said chucking device and a second motor supported from said housing and movable therewith operatively connected for actuating the work clamping means of said chucking device and means for controlling said second motor independently of said other motors.

LEO A. DUMSER.
OSCAR W. FLOODY.